United States Patent [19]
Ford et al.

[11] Patent Number: 5,363,030
[45] Date of Patent: Nov. 8, 1994

[54] BATTERY HAVING A TRANSISTOR SWITCH FOR SUPPLYING ENERGY

[75] Inventors: Robert B. Ford, Tamarac; Mehrdad Badie, Sunrise, both of Fla.

[73] Assignee: Motorola, Inc., Schaumburg, Ill.

[21] Appl. No.: 119,447

[22] Filed: Sep. 9, 1993

Related U.S. Application Data

[63] Continuation of Ser. No. 760,288, Sep. 16, 1991, abandoned.

[51] Int. Cl.$^5$ .......................................... H01M 10/44
[52] U.S. Cl. ...................... 320/13; 455/127; 455/343
[58] Field of Search ............ 455/343, 89, 127, 68, 455/92; 320/13, 10, 54

[56] References Cited
U.S. PATENT DOCUMENTS

| | | | |
|---|---|---|---|
| 3,667,026 | 5/1972 | Bogut et al. | 320/36 |
| 4,578,628 | 3/1986 | Siwiak | 320/2 |
| 4,680,527 | 7/1987 | Benenati et al. | 320/2 |
| 4,893,348 | 1/1990 | Andoh | 455/343 X |
| 4,992,340 | 2/1991 | Tidwell et al. | 429/7 |
| 5,046,136 | 9/1991 | Tokunaga et al. | 455/127 X |
| 5,212,836 | 5/1993 | Matsushita | 455/343 |
| 5,233,645 | 8/1993 | Choi et al. | 455/343 X |

*Primary Examiner*—Reinhard J. Eisenzopf
*Assistant Examiner*—Philip J. Sobutka
*Attorney, Agent, or Firm*—Robert S. Babayi; M. Mansour Ghomeshi

[57] ABSTRACT

Supply of energy to a radio device (220) as provided by a battery pack (210) is remotely controlled by coupling a transistor switch (213) between an energy source (212) within the battery pack (210) and battery terminals (222 and 224). The transistor switch (213) is controlled by a control signal (238) which is applied to the battery (210) through a control terminal (217) disposed on the battery.

2 Claims, 2 Drawing Sheets

BATTERY HAVING A TRANSISTOR SWITCH FOR SUPPLYING ENERGY

This is a continuation of application Ser. No. 07/760,288, filed on Sep. 16, 1991 and now abandoned.

TECHNICAL FIELD

This invention relates generally to the field of batteries and in particular to batteries which supply energy to a portable communication device.

BACKGROUND

Batteries are extensively used to supply energy to many portable electronic devices. Depending on the power requirement of the electronic device, batteries having various current capacities are offered, some of which may be charged by a charger.

Presently, battery-powered electronic devices, such as two-way portable radios, are used by various users, such as policemen, fire fighters, etc., who heavily rely on them for performing their daily tasks. A user interacts with the portable radio by speaking into a microphone while pressing a push-to-talk button (PTT), or by listening to a speaker during reception of messages. Therefore, it is an important concern among communication device manufacturers to facilitate the use of such portable radios. For example, a radio may couple to an accessory device such as a remote speaker/microphone, which extends the radio's interaction elements, such as microphone, speaker, antenna, and push-to-talk (PTT) button to provide a convenient means for interaction.

A portable radio may be operated from inside a vehicle by placing it in a vehicular adapter. As the name implies, the vehicular adaptor adapts the radio for use inside a vehicle and often provides additional features such as a battery charger, audio and RF power amplifiers, etc. Operationally, the radio and its battery are inserted into a pocket on the vehicular adapter which engages the radio either automatically or by manual actuation. When inserted in the vehicular adapter, the radio interacts with the vehicular adaptor either through a control panel positioned on the vehicular adaptor itself or through an accessory device, such as a remote speaker/microphone, which extends interaction capability to a remote position.

Another type of communication device which operates inside a vehicle is a mobile radio. Like portable radio devices, mobile radios may be interacted by means of the accessory device. In one arrangement, the accessory device couples to the mobile radio and includes an on/off switch positioned thereon. This arrangement allows control over coupling of the energy to the radio by means of the accessory device. This feature greatly facilitates interaction with the mobile radio since a user sitting far from the mobile radio may turn the mobile radio on or off by actuating the remotely positioned on/off switch.

It is desired to equip the accessory device which couples the vehicular adapter with such an on/off switch in order to provide remote control over the supply of energy to the portable radio as well. However, currently, the only means for controlling the supply of energy to the portable radio comprises an on/off switch disposed on the portable radio which requires the user to directly interact with the radio itself, therefore making remote interaction impractical.

One way to remotely control supply of energy is to provide a switching mechanism within the radio battery. Presently, mechanical magnetic switches are used within the battery to connect or disconnect the supply of energy to battery contacts. In this arrangement, a magnet positioned within the radio actuates the magnetic switch when the radio is engaged or disengaged from the radio.

Mechanical switches are suitable for battery applications because they provide high current handling capability needed in the portable radio application. This capability is particularly important in high-power portable radios since, in some radios, a substantially large current (i.e., in excess of 2.5 A) may be drawn from the battery in the transmit mode. However, mechanical switches are bulky and unreliable. More importantly, it is externally difficult to selectively control the supply of energy using mechanical switches. Therefore, there exists a need for a battery which conveniently allows control over the supply of energy to an external source.

SUMMARY OF THE INVENTION

Briefly, according to the invention, there is provided a battery which includes an energy source for supplying energy to a device through battery terminals. A transistor switch is coupled between the energy source and at least one battery terminal and may be controlled to selectively connect and disconnect the energy source from the battery terminal in response to a control signal. The battery includes a control terminal which couples the control signal to the transistor switch to remotely cut off the supply of energy to the device.

DETAILED DESCRIPTION OF THE PREFERRED EMBODIMENT

Figure 1:
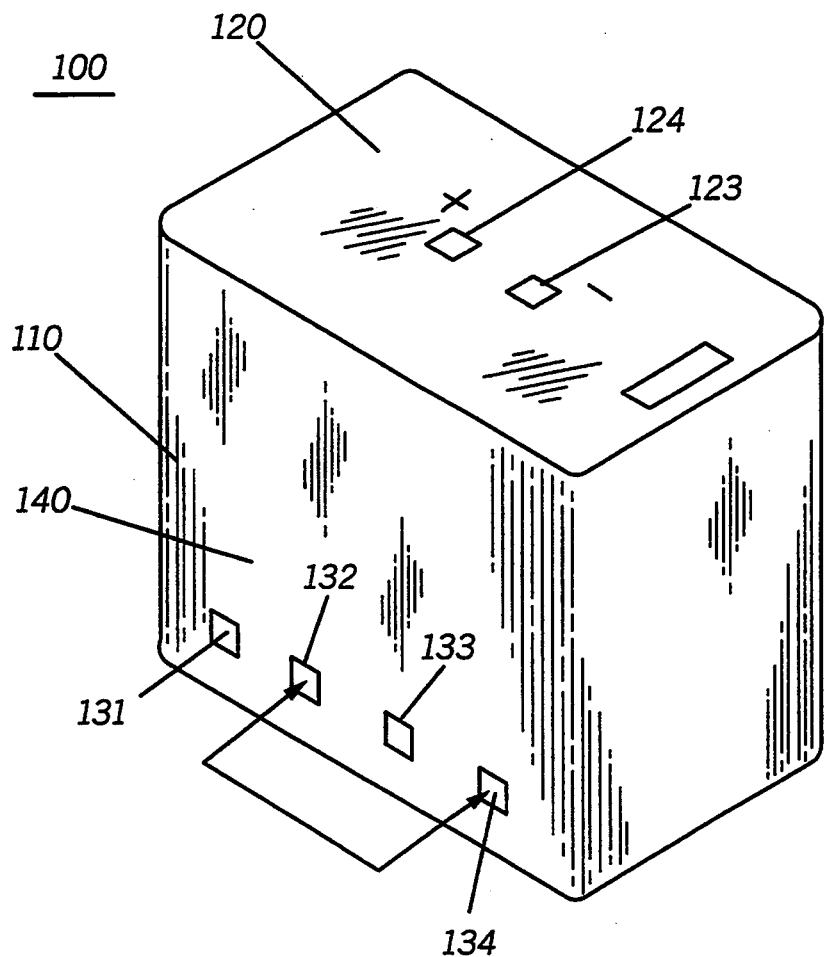
FIG. 1 is a perspective view of a battery according to the present invention.

Referring to FIG. I of the drawings, a perspective view of a battery 100, which operates according to the principles of the present invention, is shown. The battery 100 includes a housing 110 made of a material having substantial structural integrity such as polycarbonate, for example, which is sufficiently durable to protect the battery cells which are housed therein. Battery housing 110 includes an external surface 120 on which positive and negative battery contacts 123 and 124 are situated. The battery contacts 123 and 124 are electrical contacts which supply battery power to an external power-consuming device, such as a portable two-way radio (not shown). The battery 100 also includes battery charger contacts 131, 132, 133, and 134 which are employed to interface with a battery charger (not shown). The battery charger contacts 131-134 are positioned on an external surface 140 different from external surface 120 on which device contacts 123-124 are situated. The battery charger contacts 131 and 134 are properly arranged to provide charging current to the battery cells, and the battery charger contacts 132 and 133 provide temperature and current capacity information to the charger. The internal connections of battery cells and related structures to battery contacts 123-124 and 131-134 are detailed in conjunction with FIG. 2.

Figure 2:
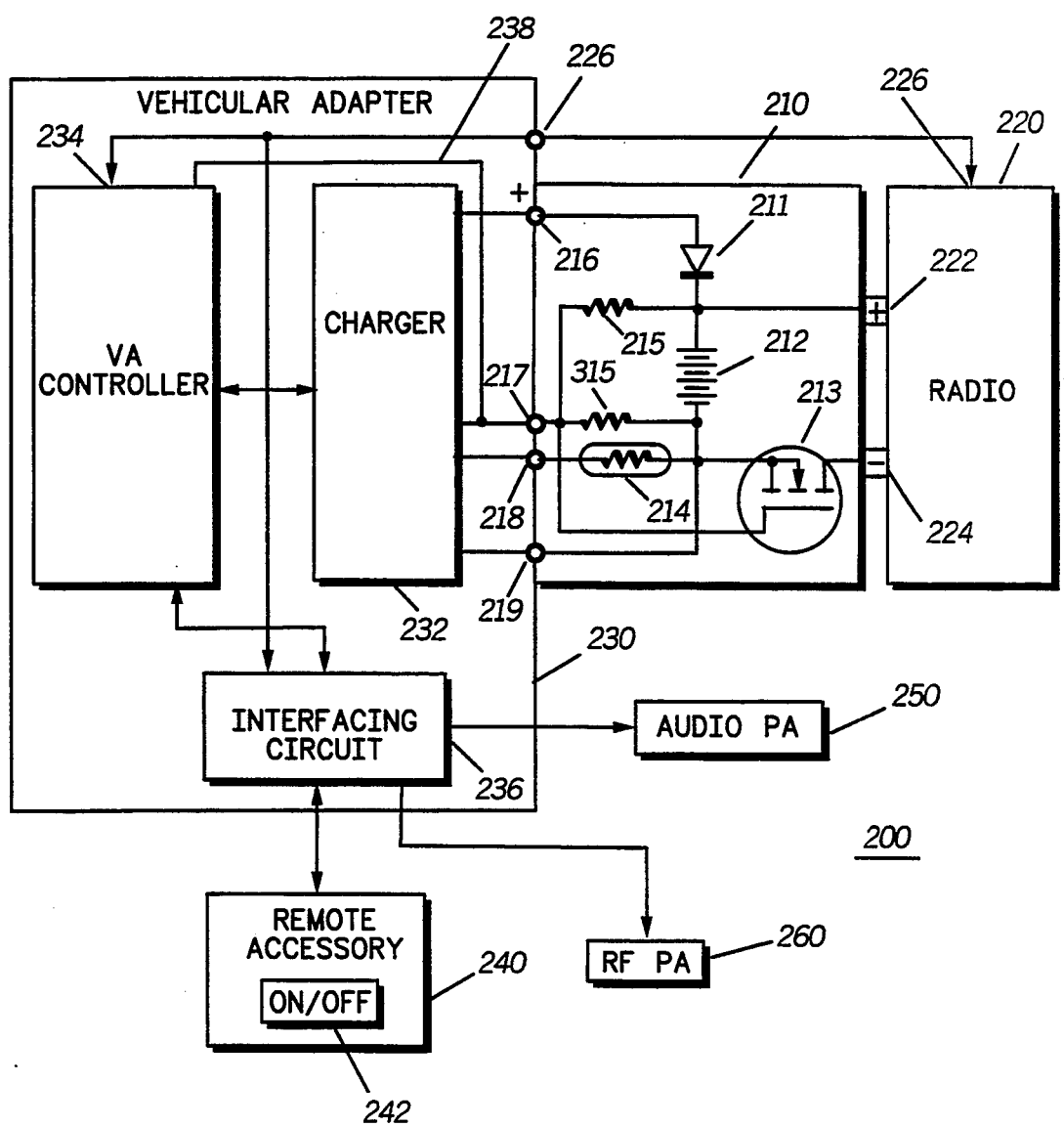
FIG. 2 is a schematic block diagram of a vehicular communication system according to the present invention.

Referring to FIG. 2, a schematic diagram of a vehicular communication device 200, which advantageously utilizes the principles of the present invention, is shown. The vehicular communication device 200 includes a vehicular adapter 230 for operating a battery powered radio device 220 from inside a vehicle (not shown). The radio device 220 may comprise any well-know portable radio, such as a SABER ® portable two-way radio manufactured by Motorola, Inc. Vehicular adapters and their operation are well known in the art. One such vehicular adaptor which could be used to implement the principles of the present invention comprises a SABER ® Vehicular Adapter manufactured by Motorola Inc.

A battery 210 is coupled to the radio device 220 and supplies the needed energy for its operation. Generally, the radio device 220 along with the battery 210 is positioned in an accommodating enclosure formed within the vehicular adaptor 230. The vehicular adaptor generally includes a well-known VA controller 234, a battery charger 232, and an interfacing circuits 236. The VA controller 234 is programmed to control the operation of the vehicular adaptor 230 in a well-known manner. The controller 234 interfaces internally with the charger 232 and the interfacing circuits 236 and it interfaces externally with the radio device 220 through the radio's external accessory connector 226.

The interfacing circuitry 236 comprises well-known circuitry which permits the radio 220 to interface with external peripheral devices, such as an external RF power amplifier 250 or an external audio amplifier 260, through the vehicular adaptor 230. The interfacing circuits 236 also permit a remote accessory unit 240 which may comprise a remote speaker/microphone unit to remotely interface with the radio device 220 through the vehicular adaptor 230.

The battery charger 232 comprises a well-known charger which is positioned within the vehicular adaptor to supply charging current when the battery 210 is positioned within the vehicular adaptor 230. The charger 232 interfaces with the battery 232 through terminals 216, 217, 218, and 219, which correspond to terminals 131–134 of FIG. 1. The battery terminals 216 and 219, which correspond to terminals 131 and 134 of FIG. 1, provide charging current paths from the charger 232 to the battery 210. The battery contacts 217 and 218, which correspond to terminals 132 and 133 of FIG. 1, provide operational information to the charger 232 for controlling the charge function.

The battery pack 210, which embodies the principles of the present invention, includes a plurality of battery cells 212 having energy source output terminals. The battery cells 212 comprising well-known nickel-cadmium cells for sourcing energy to the radio 220 via positive battery terminal 222 and negative battery terminal 224. A diode 211 is coupled between the battery cells 212 and the battery contact 216 to prevent current from battery cells 212 from flowing into the charger 232. As is well known, a thermistor 214 within the battery 210 is coupled to battery contact 218 to provide the threshold voltage for cutting off the charging current when a predetermined battery temperature is exceeded.

According to the invention, the battery 210 includes a transistor switch 213 coupled between the negative battery terminal 224 and the the battery cells 212. In the preferred embodiment of the invention, the transistor 213 comprises a high-power MOSFET device capable of handling substantially large current. One such device is a BSP-17 SIPMOS ® Small-Signal Transistor manufactured by Siemens which is capable of handling large current (i.e. up to 2.9 A) and presenting a very low on-resistance (less than 0.1 $\Omega$). Normally, the transistor 213 is turned on by maintaining its gate voltage above source voltage by a gate voltage which is greater than one volt. The gate voltage is provided by a resistor divider network comprising resistors 215 and 315. The resistors 215 and 315 are selected to present an extremely high impedance across the battery cells 212, thereby causing a very low standby current drain. Moreover, the resistors 215 and 315 are selected to present an impedance at terminal 217 which informs the charger of charge capacity of the battery 210 as is well known in the art.

Operationally, when the gate voltage is above one volt, the transistor 213 is closed to provide a return current path which allows battery cells to supply energy to the radio device 220. However, when the gate voltage drops below one volt, the transistor 213 acts as an open switch, cutting off the supply of energy to the radio device 220.

It may be appreciated that by connecting the terminal 217 to the negative battery terminal 219, the gate voltage drops below one volt and the supply of energy to the radio device 220 is cut off. This is shown in FIG. 1 by providing a connection (shown as an arrowed line) between battery contact 132 (corresponding to terminal 217 of FIG. 2) and battery contact 134 (corresponding to the battery terminal 219 of FIG. 2). Accordingly, the terminal 217 (corresponding to terminal 132 of FIG. 1) constitutes a control terminal for coupling a control signal to the transistor switch 213 in order to remotely control supply of energy from the battery to external devices.

Now referring back to FIG. 2, the principles of the present invention are used to remotely control the supply of energy to the radio device 220 in the vehicular communication system 200. In this arrangement, the remote accessory unit 240 includes an on/off switch 242 which may be used to cut off the supply of energy to the radio device 220. When the on/off switch 242 is activated, the interfacing circuit 236 informs the VA controller 234 of such activation. The VA controller then generates a control signal 238 which is coupled to the battery terminal 217. The control signal 238 comprises an open collector signal which may selectively provide a short or an open path to ground across the battery terminal 217. When the on/off switch is activated so as to cut off the energy supply to the radio device, the control signal presents a ground potential at terminal 217 which causes the gate voltage to become substantially zero, thereby turning off the transistor 213. Alternatively, when the on/off switch is activated to supply energy to the radio device, the control signal 238 provides an open path across terminal 217 which causes the transistor 213 to turn on.

Accordingly, the on/off switch 242 may be used to remotely control the supply of energy without a need to interact with the radio device 220 directly. Therefore, the battery of the present invention significantly facilitates control over supply of energy by allowing an external control signal to remotely switch an energy source to couple to battery contacts.

What is claimed is:

1. A battery pack for use with other devices, comprising:

an energy source for supplying energy to a device through energy source output terminals;

battery terminals for coupling said device to said energy source;

a transistor switch coupled between said energy source output terminals and at least one battery terminal for selectively controlling supply of energy to at least one of said battery terminals in response to an external control signal;

a control terminal for coupling said external control signal to said transistor switch wherein said control signal is generated by having said control terminal coupled to at least on of the energy source output terminals so as to control the supply of energy.

2. The battery pack of claim 1, wherein said transistor switch comprises a field effect transistor having a gate coupled to said control terminal.

* * * * *